H. B. BAGG.
SCALE BALANCING DEVICE.
APPLICATION FILED AUG. 7, 1918.
1,411,600.
Patented Apr. 4, 1922.
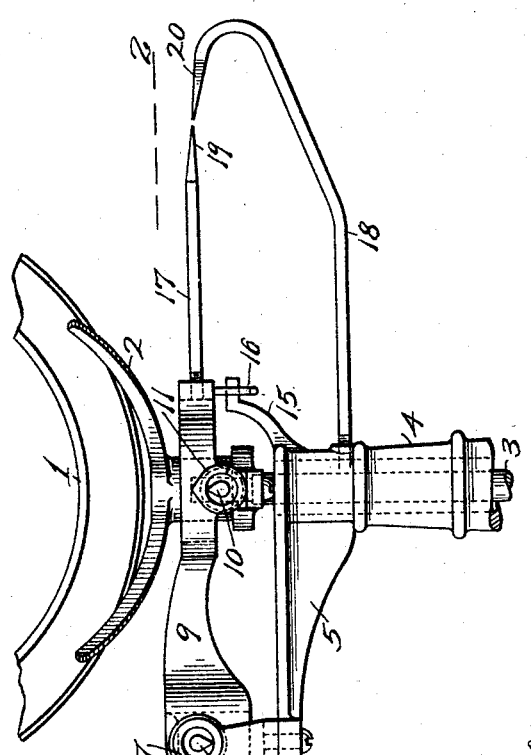
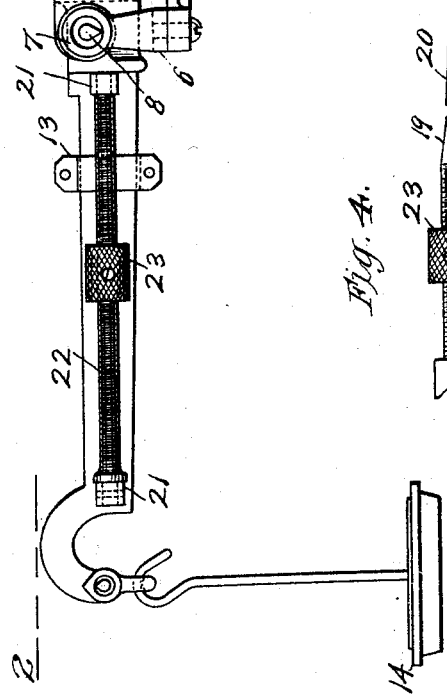
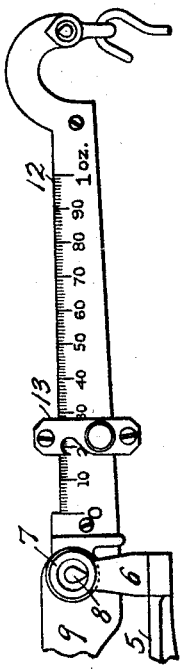
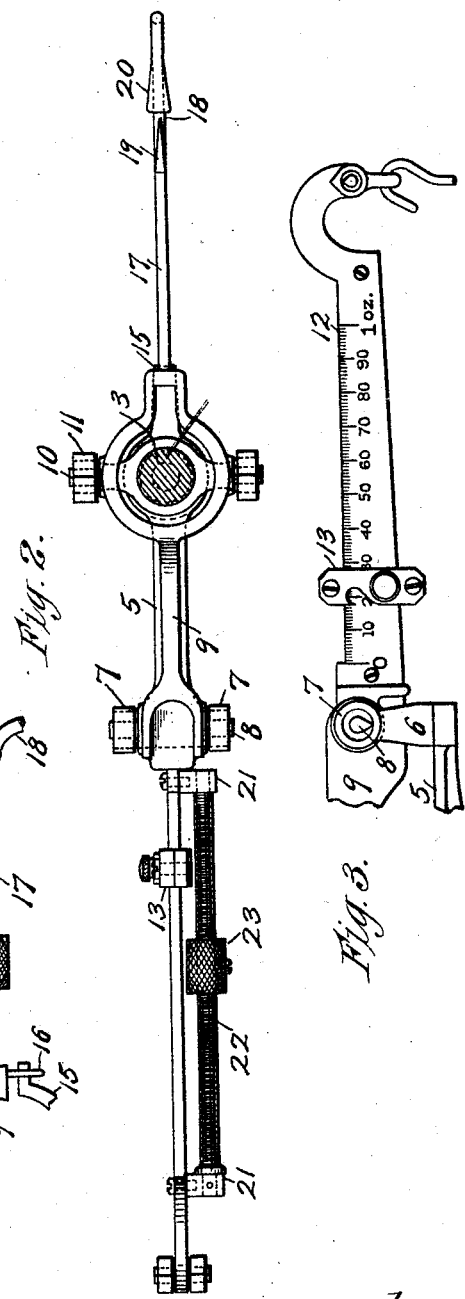
Inventor:
Hollis B. Bagg
by his Attys:
Philipp, Sawyer, Rice & Kennedy ately, accurately and quickly
UNITED STATES PATENT OFFICE.

HOLLIS B. BAGG, OF WATERTOWN, CONNECTICUT, ASSIGNOR TO SCOVILL MANUFACTURING COMPANY, A CORPORATION OF CONNECTICUT.

SCALE-BALANCING DEVICE.

1,411,600. Specification of Letters Patent. Patented Apr. 4, 1922.

Application filed August 7, 1918. Serial No. 248,680.

*To all whom it may concern:*

Be it known that I, HOLLIS B. BAGG, a citizen of the United States, residing at Watertown, county of Litchfield, and State of Connecticut, have invented certain new and useful Improvements in Scale-Balancing Devices, fully described and represented in the following specification and the accompanying drawings, forming a part of the same.

This invention relates to improvements in scale balancing devices.

As is of course well known, before weights can be properly determined in a scale, the beam of the scale must be in equilibrium, that is, the scale must be what is technically known as "in balance." The balancing of a single beam scale is ordinarily accomplished by adding or deducting small weights, such as shot, to or from the counterpoise, the counterpoise being chambered out to receive the shot. Such scales are usually provided with a controlling loop and lug which determine the movement of the beam in either direction and whether or not the scale is in balance is determined by observing the position of some moving part of the scale with respect to some stationary part, as, for instance, the position of the lug in the loop. Obviously, a balance determination obtained in this way is rough, depends to a very great extent on the judgment of the individual making the balance, and is unsuitable for fine work where the balance determination needs to be very accurate.

The present invention has for its object to produce a construction for balancing a single beam scale which is simple, inexpensive to construct, may be readily attached to well known forms of scale now in use and which enables a fine determination of balance to be readily, accurately and quickly made.

With this and other objects not specifically referred to in view, the invention consists in certain constructions, and in certain parts, improvements and combinations, as will be hereinafter fully described and then specifically pointed out.

In the accompanying drawings,

Figure 1 illustrates in side elevation, so much of an ordinary uneven single beam scoop scale as is necessary for an understanding of the invention, one form of the improved balance determining mechanism being shown in connection therewith.

Fig. 2 is a plan view on the line 2—2 of the construction shown in Fig. 1.

Fig. 3 is a side elevation of the graduated part of the beam, and

Fig. 4 illustrates a modified construction of the balance determining means.

In the drawing the scoop of the scale is indicated at 1, the scoop resting in the usual arms 2 carried on the connecting rod 3 which moves through the standard 4. The standard 4 carries an arm 5 which is provided with uprights 6 having the usual bearings 7, these bearings receiving the usual knife edge bearings 8 carried on the butt 9 of the beam, the bearings which have just been described being usually termed the fulcrum bearings. The butt of the beam is provided with the usual knife edge bearings 10 which rest in circular bearings 11, these bearings being carried on the standard of the scale all as is usual in constructions of this character. The graduated portion of the beam is indicated at 12, the poise cooperating therewith at 13 and the usual counterpoise at 14. The lug and loop employed for determining the movement of the beam are also illustrated, the lug being marked 15 and the loop 16. All these parts are of usual construction.

In carrying the invention into effect, a pair of registering elements is employed. While these elements may be variously constructed and arranged, in the particular construction illustrated, one of these elements is shown as a finger 17 which is mounted on and projects from the butt of the beam. The cooperating registering element is shown as a finger 18 extending from the scale standard, this element being bent upwardly. These parts when employed are so arranged that when the scale is in balance the ends of these fingers lie directly opposite each other. It is apparent that in making fine determinations, the registering elements should be so constructed as to enable a very accurate balance to be obtained. In the particular construction illustrated this is accomplished by forming one of the elements with a pointed end and the other with a blade surface, the finger 17 being shown as having the pointed end 19 and the finger 18 being shown as having a blade surface 20.

It may be remarked that in scales of the character illustrated, there is some tendency of the beam in weighing to swing in a horizontal plane. By forming one of the registering elements with a blade surface, the corresponding pointed end of the other will be opposite some part of the blade surface when the scale is in balance, notwithstanding the horizontal movement of the parts referred to.

The means for effecting the balance of the scale may be variously arranged. In the construction shown in Fig. 1, the graduated portion of the beam carries a pair of supports 21 in which is carried a threaded rod 22. When this construction is employed, care should be taken that the threaded rod is located accurately along the gravity line of the beam. This threaded rod supports a weight 23 which can be moved toward and away from the fulcrum bearing of the beam to effect the balance.

In the construction shown in Fig. 4, the finger 17 is threaded and the weight 23 is mounted thereon. This latter construction presents certain advantages in the way of cheapness.

Changes and variations may be made in the constructions herein shown and described for carrying the invention into effect. The invention is not therefore to be confined to the particular constructions shown and described.

What is claimed is:

1. The combination, in a single beam scale, of a registering element extending from the butt of the scale beam, a weight carried on said element and adjustable along it for balancing the scale, and a cooperative registering element.

2. The combination, in a single beam scale, of a registering finger having a pointed end extending from the butt of the scale beam, a balancing weight adjustable along said finger for balancing the scale, and a cooperating blade element stationary with respect to the finger.

3. The combination, in a single beam scale, of a registering element comprising a finger extending from the butt of the scale beam, a weight mounted on said element and adjustable along it for balancing the scale, and a cooperating registering element stationary with respect thereto, one of said elements having a pointed end, and the other presenting a cooperating blade surface.

4. The combination, in a single beam scale, of a counterpoise hanging from one end of the scale beam for adjustment by relatively large increments, a registering element extending from the other end of the beam, a balancing weight adjustable along said element for adjustment by relatively small increments, and a cooperating registering element stationary with respect to the first named registering element.

In testimony whereof, I have hereunto set my hand.

HOLLIS B. BAGG.